United States Patent
Dean, Jr. et al.

[11] Patent Number: 5,940,561
[45] Date of Patent: Aug. 17, 1999

[54] ADAPTER ASSEMBLY FOR PRECISE ALIGNMENT OF FIBER OPTIC CONNECTORS

[75] Inventors: David L. Dean, Jr.; Karl M. Wagner; James P. Luther; Markus A. Giebel, all of Hickory, N.C.

[73] Assignee: Siecor Corporation, Hickory, N.C.

[21] Appl. No.: 08/841,537

[22] Filed: Apr. 23, 1997

[51] Int. Cl.[6] ........................................ G02B 6/38
[52] U.S. Cl. ........................... 385/60; 385/59; 385/66
[58] Field of Search ............................ 385/59, 60, 65, 385/83, 56, 66, 84

[56] References Cited

U.S. PATENT DOCUMENTS

| | | | |
|---|---|---|---|
| 4,099,832 | 7/1978 | Warner, Jr. .................... | 350/96.21 |
| 4,490,007 | 12/1984 | Murata ........................... | 350/96.21 |
| 4,645,295 | 2/1987 | Pronovost ...................... | 350/96.2 |
| 5,602,951 | 2/1997 | Shitota et al. ................. | 385/65 |
| 5,664,039 | 9/1997 | Grinderslev et al. .......... | 385/65 |
| 5,737,463 | 4/1998 | Weiss et al. ................... | 385/59 |
| 5,748,818 | 5/1998 | Weiss et al. ................... | 385/59 |

FOREIGN PATENT DOCUMENTS

| | | | |
|---|---|---|---|
| 55-076316 | 9/1980 | Japan ............................. | G02B 7/26 |

Primary Examiner—Hung N. Ngo

[57] ABSTRACT

An adapter assembly is provided for removably receiving two optical fiber ferrules of the type with open grooves extending longitudinally rearward of the end face of the ferrule. The assembly comprises a sleeve with an interior surface that defines a passageway therethrough sized for receiving the ends of the ferrules therein. The interior surface also defines two longitudinal grooves opposite each other that open to the passageway. A guide pin is located in each groove such that an exposed portion of the outer surface of the guide pin along the entire length of the guide pin inside the sleeve is exposed to the passageway. The exposed portion are sized and located relative to each other to slide in the ferrule grooves and operatively align the end faces of the ferrules rotationally and laterally relative to each other when the two ferrules are inserted into the sleeve.

24 Claims, 5 Drawing Sheets

ADAPTER ASSEMBLY FOR PRECISE ALIGNMENT OF FIBER OPTIC CONNECTORS

BACKGROUND OF THE INVENTION

With conventional single fiber ferrules that are used in industry standard connectors such as SC, FC and ST® connectors, lateral alignment of the end faces of the ferrules is accomplished by use of an alignment sleeve into which two opposed cylindrical ferrules are inserted and aligned. Because there is a single fiber located concentric to the outer diameter of the ferrule, the relative rotational alignment of the two opposed end faces is not as critical. In such connectors, the cylindrical ferrules are rotationally fixed relative to the connector housing in which the ferrule is mounted but there is no alignment mechanism to rotationally align the ferrule end faces relative to each other as they are abutted. This practice is not sufficient for multi-fiber ferrules. In multi-fiber ferrules of the type in co-pending application Ser. No. 08/540,288 assigned to the assignee of the present application, all the fiber bores clearly cannot be on the center line of the ferrule, thus it can be appreciated that the relative rotational position of opposed end faces is now just as critical as the relative lateral position of the two end faces.

Ser. No. 08/540,288 discloses the use of one rib formed inside a sleeve in conjunction with a precision inner diameter of the sleeve to achieve rotational and lateral alignment of opposed end faces of two ferrules. This arrangement suffers from the drawback of having to form or machine a precision inner diameter of the sleeve and a precision outer diameter of the ferrule which is difficult over such large surface areas.

Additionally, a formed rib with a precision inner diameter is not as precise as the use of guide pins inserted in the end face of ferrules as with MT type ferrules and MTP type connector which use MT ferrules as disclosed in U.S. Pat. No. 5,214,730 to Nagasawa. The use of two guide pins achieves precise rotational as well as lateral alignment because the two guide pins span the interface of the two opposed end faces into guide pin holes on the end faces. The guide pin holes in the end face of the ferrules are located very precisely relative to the fiber array also on the end face of the ferrule.

While the use of guide pin holes and guide pins has proven to align opposing ferrules very precisely, they are extremely tedious and troublesome to use. Initial insertion of the pins into the ferrule faces is painstaking and pins commonly fall out of the ferrules. The drawbacks of the guide pins are heightened even further in the connector and adapter application because the second connector to be inserted is inserted blind and a guide pin and guide pin hole may not line up due to slight variations in adapter and connector dimensions from part to part. Also, connectors are typically connected and disconnected frequently and guide pins may fall out. Another concern with guide pins is that a pair of connectors may be mated with less than both guide pins due to craft inadvertence or lack of training and the fibers would most likely not be aligned.

Yet another concern with guide pins is whether to always have one guide pin per one connector or have two guide pins in half of the connectors and none in the other half. With either option there is potential for guide pins to be transferred from one connector to the other when the connectors are disconnected. This renders that connector out of conformance with whatever guide pin scheme has been adopted.

Moreover, in some applications, one of the connectors remains in the adapter and the other side of the adapter receives different connectors. The adapter acts as a shroud to the stationary protector making it impractical to see the status of the guide pins on its end face. Another drawback is the cleaning of the connector end faces. With guide pins in the connector, they must be removed before the end face can be properly cleaned.

Therefore a need exists for a connector and adapter arrangement which takes advantage of the preciseness of the guide pins' rotational and lateral alignment that is so critical with ferrules that have more than one fiber yet eliminates the various drawbacks associated with guide pins.

SUMMARY OF THE INVENTION

The present invention overcomes the drawbacks of guide pins by mounting them in the adapter assembly that receives the two connectors. One aspect of the present invention is an adapter assembly for removably receiving two optical fiber ferrules in an operative coupled relationship. The ferrules are of the type containing at least one optical fiber that terminates at an end face of the ferrule. Each ferrule defines at least two ferrule grooves extending longitudinally rearward of the end face opposite each other. The adapter assembly comprises a sleeve having a first open end and a second open end opposite thereto and having an interior surface defining a passageway longitudinally through the sleeve from the first open end to the second open end. The sleeve has an exterior surface. The first open end and the second open end are each dimensioned for removably receiving one of the two ferrules therein for operative coupling with the other ferrule inserted opposite thereto in the passageway. The interior surface defines two sleeve grooves extending longitudinally opposite each other.

The assembly also has two guide pins with each guide pin located longitudinally in one of the two sleeve grooves. Each guide pin has a length and defines an outer surface along its length. Each guide pin is mounted in its respective sleeve groove such that an exposed portion of the outer surface of the guide pin along substantially the entire length of the guide pin is exposed to the passageway. The exposed portions of the outer surfaces of the guide pins are sized and located relative to each other to slide in the ferrule grooves and operatively align the end faces of the ferrules rotationally and laterally relative to each other when the two ferrules are inserted into the sleeve.

Another aspect of the present invention is an adapter assembly for removably receiving two optical fiber ferrules in an operative coupled relationship. Each ferrule contains at least one optical fiber that terminates at an end face of the ferrule and defines at least two ferrule grooves extending longitudinally rearward of the end face opposite each other. The adapter assembly comprises a sleeve having a first open end and a second open end opposite thereto and having an interior surface defining a passageway longitudinally through the sleeve from the first open end to the second open end. The passageway is sized to receive the two ferrules therein to the extent that a length of the ferrule grooves of each ferrule is disposed inside the passageway when the ferrules are fully received in the sleeve. The sleeve has an exterior surface. The assembly also comprises two guide pins permanently mounted in the sleeve parallel to each other and parallel with the passageway and located opposite each other in the passageway. At least a longitudinal portion of the outer surfaces of each guide pin is exposed in the passageway. The portions are shaped and located relative to each other to slide in the ferrule grooves of the ferrules and operatively align the end faces of the ferrules rotationally and laterally relative to each other when the two ferrules are inserted into the sleeve.

Another aspect of the present invention is an adapter assembly for removably receiving two optical fiber ferrules in an operative coupled relationship with each ferrule containing at least one optical fiber that terminates at an end face of the ferrule and defining at least two ferrule grooves extending longitudinally rearward of the end face opposite each other. The adapter assembly comprises a sleeve having a first open end and a second open end opposite thereto and having an interior surface defining a passageway longitudinally through the sleeve from the first open end to the second open end. The passageway is sized to receive the two ferrules therein to the extent that a length of the ferrule grooves of each ferrule is disposed inside the passageway when the ferrules are fully received in the sleeve. The sleeve has an exterior surface. The assembly also has two ribs along the interior surface and extending longitudinally parallel with the passageway and protruding radially inward into the passageway. The ribs are shaped and located relative to each other to slide in the ferrule grooves of the ferrules and operatively align the end faces of the ferrules rotationally and laterally relative to each other when the two ferrules are inserted into the sleeve.

Another aspect of the present invention is the adapter assembly further comprising an inner block that has a mid portion that receives the sleeve laterally therein and has latch arms extending out parallel with the sleeve that engage a connector housing. A further aspect is the combination of connectors with the adapter assembly that have ferrules with open grooves extending longitudinally rearward of the end faces of the ferrules. With the various aspects of the present invention, the drawbacks of using guide pins in the connector faces are eliminated. The guide pins are permanently held in the adapter assembly and connectors can be mated and unmated and different connectors interchanged on the same adapter assembly without concern for the location of guide pins on the various connectors or losing the guide pins. Additionally, the connectors are more easily manufactured and cleaned without concern for removing and replacing guide pins.

DETAILED DESCRIPTION

Figure 1:
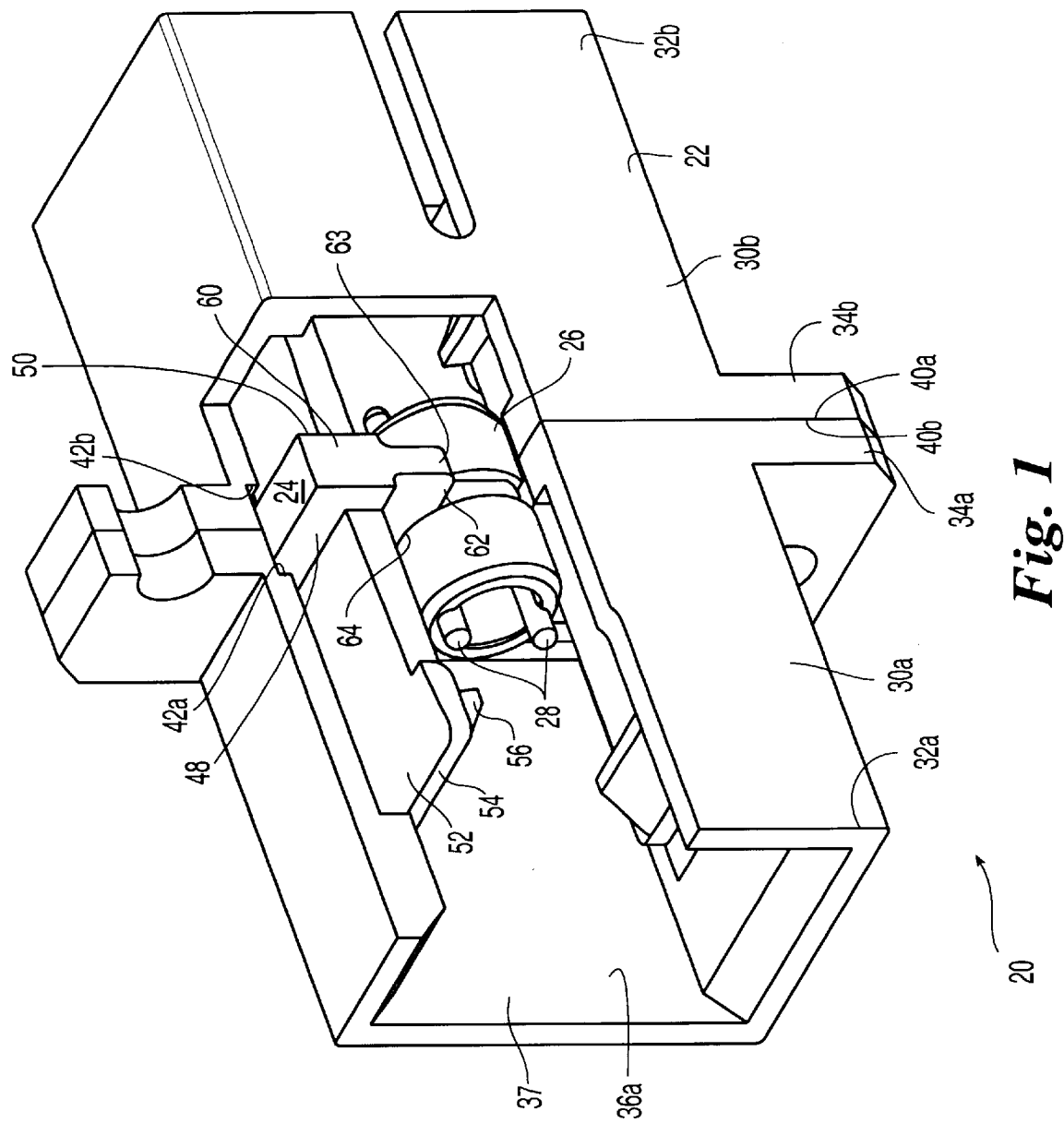
FIG. 1 is a cut away perspective view of the preferred embodiment of the adapter assembly of the present invention.

With reference to FIGS. 1–4, a preferred embodiment of adapter assembly 20 will be described. Adapter assembly 20 is shown with outer housing 22, inner block 24, guide sleeve 26 and a pair of guide pins 28. In the preferred embodiment outer housing 22 is an industry standard SC housing that is sized to receive conventional SC connectors. Outer housing is typically comprised of two halves 30a, b that have free ends 32a, b and flange ends 34a, b opposite thereto. Halves 30a, b define passageways 36a, b therethrough from free ends 32a, b to flange ends 34a, b. Halves 30a, b are ultrasonically welded at opposing flanges 34a, b such that passageways 36a, b communicate and define continuous passageway 37. Flange ends 34a, b have flange surfaces 40a, b that are generally perpendicular to passageways 36a, b. Flange surfaces 40a, b have recessed shoulders 42a, b. When halves 30a, b are joined at flanged surfaces 40a, b, opposed recessed shoulders 42a, b capture inner block 24 therebetween.

Inner block 24 has first side 48 and second side 50 opposite thereto. Extending from first side 48 and second side 50 is a pair of latching arms 52. Latching arms have free ends 54 which are shaped according to conventional latch arm ends found in standard SC adapters with a downwardly extending ramp projection 56. Projections 56 on the latching arms 52 of a pair face towards each other and are located to push-pull fit to a standard SC connector inner housing.

Inner block 24 has mid-portion 60 which defines cut-out 62. Cut-out 62 opens laterally and has entry portion 63 and sleeve receiving portion 64 inside of entry portion 63. Sleeve 26 is inserted laterally through entry portion 63 until it is disposed longitudinally through receiving portion 64. Receiving portion 64 defines flat 65. The outer envelope dimensions of inner block 24 are generally the same as the outer envelope dimensions of a pair of inner halves as shown, for example, in U.S. Pat. No. 5,359,688 to Underwood which shows a conventional pair of inner halves which are termed "containment members 32, 39" therein. However, in the present invention it is preferred that inner block 24 be one piece.

Figure 2:
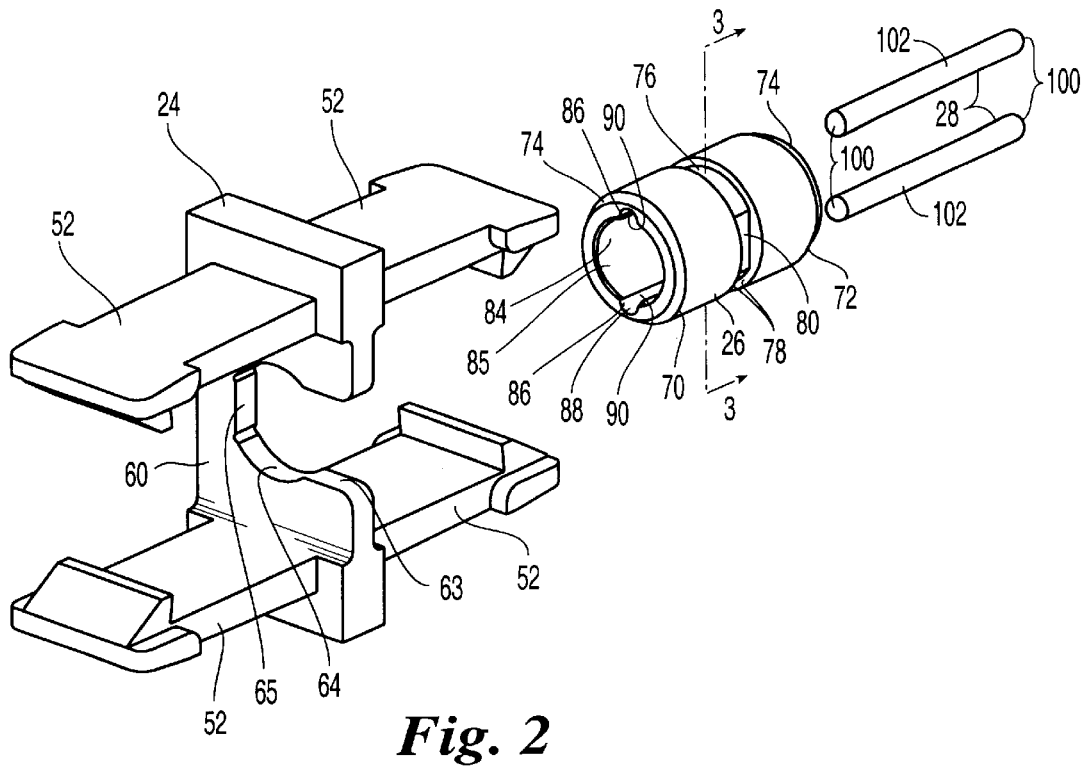
FIG. 2 is an exploded view of the inner block, sleeve and guide pins of the preferred embodiment of the present invention.
Figure 3:
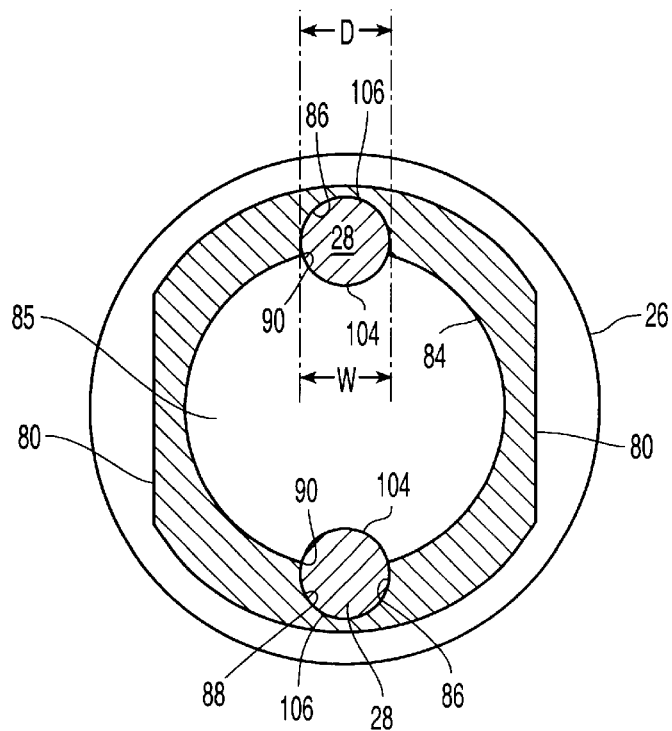
FIG. 3 is a cross-section along line 3—3 of FIG. 2.

With more particular reference to FIGS. 2–3, guide sleeve 26 is shown. Guide sleeve 26 is preferably laterally inserted into cut-out 62 of inner block 24. Guide sleeve 26 is generally cylindrically shaped having a first end 70 and second end 72 opposite thereto. The cross section of guide sleeve 26 is generally constant between first end 70 and second end 72 with the exception of tapered portions 74 at first end 70 and second end 72 and key portion 76 generally at the mid-point between first end 70 and second end 72. The diameter at key portion 76 is stepped radially inward to define opposed shoulders 78. Key portion 76 has a generally circular circumference with exception of opposed flaps 80. Guide sleeve 26 is laterally inserted into cut-out 62 of mid portion 60 of inner block 24 with key portion 76 disposed in receiving portion 64 such that opposed shoulders 78 will have some of mid-portion 60 of inner block 24 disposed therebetween thereby preventing guide sleeve 26 from longitudinally sliding out of cut-out 62. Guide sleeve 26 is inserted so that one of opposed flats 80 is disposed against flat 65 of cut-out 62. As such, the flats act to key guide sleeve 26 in cut-out 62 so as to locate guide pins 28 at the desired rotational position relative to inner block 24.

Guide sleeve 26 defines inner surface 84 which is generally cylindrical and which defines passageway 85. However, it should be understood that inner surface could have a rectilinear cross-section to receive rectilinear ferrules. Inner surface 84 defines longitudinal grooves 86 which are generally continuous from first end 70 to second end 72 of guide sleeve 26. In the preferred embodiment, there are two grooves 86 diametrically opposed to each other in inner surface 84. In the preferred embodiment the grooves have groove surface 88 with partial circular cross section of greater than 180° but less than 360° and preferably about 200°–300°. Therefore, the cross section of grooves 86 has a diameter of the partial circular portion as well as longitudinal gap 90 that opens to the inside of guide sleeve 26. Because the partial circular cross section is greater than 180°, the width W of longitudinal gap 90 will be less than the diameter D of the partial circular cross section (See FIG. 3).

Guide pins 28 are preferably insert molded within grooves 86. For ease of manufacture, guide pins 28 have outer surface 102 that is generally cylindrical and has a generally constant cross section with the exception of rounded ends 100. Guide pins 28 have a diameter generally the same as the diameter of the partial circular cross section of groove 86. Because the partial circular cross section of groove 86 is more than 180°, the width of longitudinal gap 90 is less than the diameter of guide pins 98 and therefore grooves 86 positively retain guide pins 28 from falling out of grooves 86 in a radially inward direction. Preferably, guide pins 28 extend beyond first end 70 and second end 72 of guide sleeve 26 to aid in the retention of guide pins 28 during the insert molding process.

Because the diameter of guide pins 28 is generally that of the partial circular cross-section of grooves 86, exposed portion 104 of outer surface 102 is exposed to passageway 85. The outer periphery of exposed portion 104 is arcuate through about 60–160 degrees. Exposed portion 104 preferably extends longitudinally continuously along the length of guide pins 28 that is inside passageway 85 of guide sleeve 26. However, it should be understood that if the ferrules have stepped end faces, exposed portion 104 may end at a point before the midpoint of the guide pins. Also, exposed portion 104 may begin at a point longitudinally inside of first end 70 and second 72 of guide sleeve 26. Exposed portions 104 are sized and located relative to each other to operatively align the end faces of the ferrules rotationally and laterally relative to each other when the ferrules are inserted into the guide sleeve.

Unexposed portion 106 of outer surface 102 of guide pins 28 is disposed against groove surface 88. Because guide pins 28 are preferably metal and insert molded in guide sleeve 26 which is preferably a thermoplastic material, for example Ultem® sold by General Electric, various techniques can be used to help ensure that guide pins 28 do not longitudinally slide within grooves 86. For example, unexposed portion 106 of outer surface 102 can be disrupted in a radial direction such that the plastic will conform at least partially to the disruption during insert molding and provide positive retention of guide pins 28 in the longitudinal direction. Various examples of such disruption may be welding a length of wire or other metal piece to unexposed portion 106, machining circumferential notches in unexposed portion 106, or using a tubular guide pin and drilling holes into unexposed portion 106, or using a guide pin with a c-shaped cross section and orienting the open part of the cross-section into groove 86. Another example is the guide pins having a length less than the length of guide sleeve 26 and have grooves 86 terminate before first open end 70 and second open end 72 of guide sleeve 26 such that guide pins 28 are positively captured in grooves 86 in the longitudinal direction. Another example is having a reduced diameter or an increased diameter of the guide pins at a midpoint of the pins such that the plastic conforms about the different diameter. The different diameter portion can be short enough that it will not interfere with mating of the end faces of ferrules with stepped end faces like that shown in FIGS. 4–6.

Figure 4:
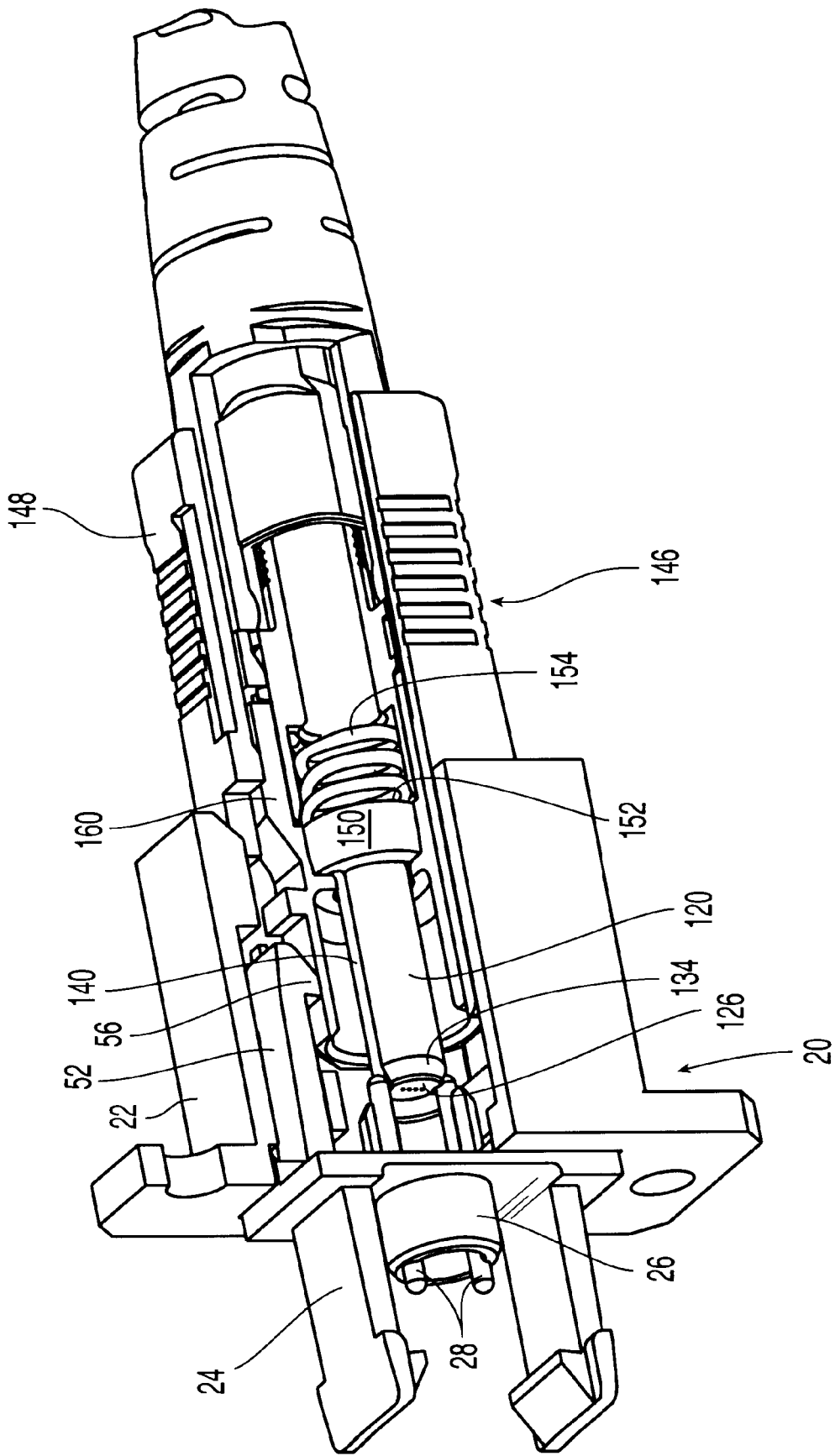
FIG. 4 is a cut away view of the preferred embodiment of the adapter assembly of the present invention with a connector being inserted therein.
Figure 5:
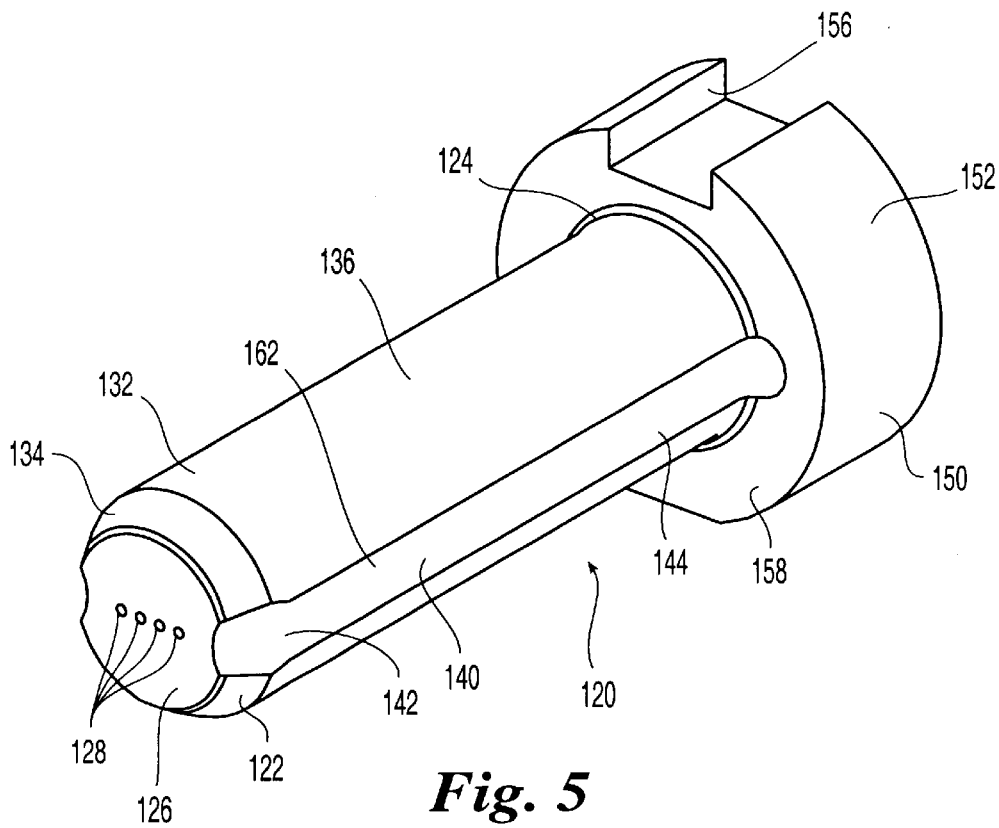
FIG. 5 is a perspective view of the preferred embodiment of the ferrule for use with the present invention.
Figure 6:
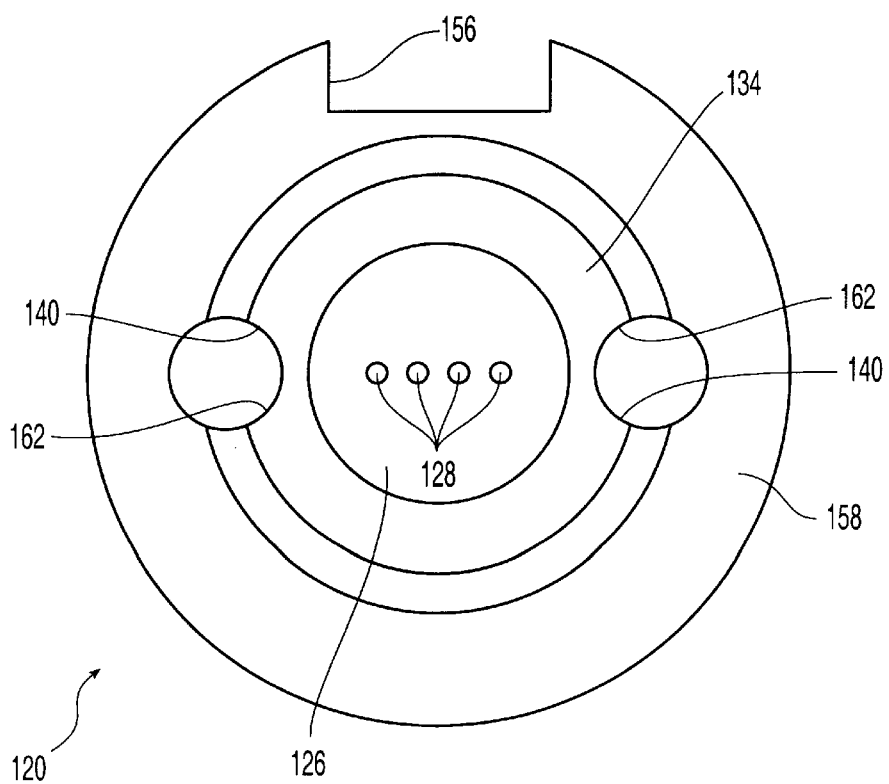
FIG. 6 is an end view of the ferrule of FIG. 5.

With reference to FIGS. 4–6, the preferred embodiment of ferrule 120 is shown with first end 122 and second end 124 opposite thereto. First end defines end face 126 perpendicular to the longitudinal axis of the ferrule. Fiber bores 128 open through end face 126 so that fibers in bores 128 terminate at end face 126. In the preferred embodiment, end face 126 is tapered down from body 132 of ferrule 120 defining taper portion 134 of ferrule 120. Body 132 of ferrule 120 has outer surface 136 that is generally cylindrical.

Ferrule grooves 140 are formed in outer surface 136 of ferrule 120 and extend from first end 122 to second end 124. Grooves 140 have a depth radially inward that does not exceed the radial inward extent of tapered portion 134 therefore first end 142 of groove 140 begins at taper portion 134 behind end face 126. It should be understood that taper portion 134 can be eliminated such that end face 126 has a diameter equal to that of body 132 and groove 140 would begin at end face 126. However, the reduced area of end face 126 is preferred for machining and polishing considerations. Grooves 140 have second end 144 opposite first end 142.

Annular key ring 150 is defined at second end 124 of ferrule 120. Key ring provides back surface 152 for spring 154 abutted there against. Located on key ring 150 is slot 156 for engaging a corresponding key (not shown) in inner connector housing 160. Slot 156 prevents ferrule 120 from rotating within connector assembly 146. Key ring 150 also has front surface 158 facing towards first end 122 of ferrule 120. Front surface 158 is perpendicular to the longitudinal direction. Ferrule grooves 140 extend slightly into front surface 158 of key ring 150 in the embodiment shown.

Ferrule grooves 140 have groove surface 162 that has an arcuate cross-section of less than 180 degrees and preferably about 60–160 degrees. Ferrule groove surface 162 preferably has a radius of curvature that generally matches that of exposed portion 104 of guide pins 28 so that exposed portion 104 will be slidably received in close tolerance in ferrule groove 140 for aligning opposing end faces 126 of ferrules 120. It should be understood that the cross-section of ferrule groove and exposed portion 104 do not necessarily have to match. For example, ferrule grooves 140 could have V-shaped cross-sections and the exposed portions of guide pins 28 could be arcuate. One advantage of V-grooves is that there are only two lines of sliding contact between exposed portion 104 of guide pins 28 and the surfaces of a V-groove which may reduce friction forces between the guide pins and the ferrule grooves.

In the preferred embodiment, ferrule grooves 140 have a precise radius of curvature that closely matches that of exposed portion 104 of guide pins 28 starting at first end 142 of groove 140 and extending back for about 4 mm and then the cross-section of the groove is gradually enlarged toward second end 144 of grooves 140. The enlarging the grooves after about 4 mm reduces the friction forces between the guide pins and the ferrule grooves yet the initial 4 mm length is sufficient to precisely align the ferrule end faces rotationally and laterally relative to each other as the guide pins slide therein.

With reference to FIG. 4, ferrule 120 is mounted in connector assembly 146 that has outer housing 148 and inner housing 160 that have industry standard outer envelope dimensions and latch engagement features. Ferrule 120 is mounted in inner housing in the same manner as disclosed in co-pending application Ser. No. 08/540,288 and such application is incorporated herein by reference for further explanation of key ring 150 and its interaction with the interior of connector assembly 146.

Figure 7:
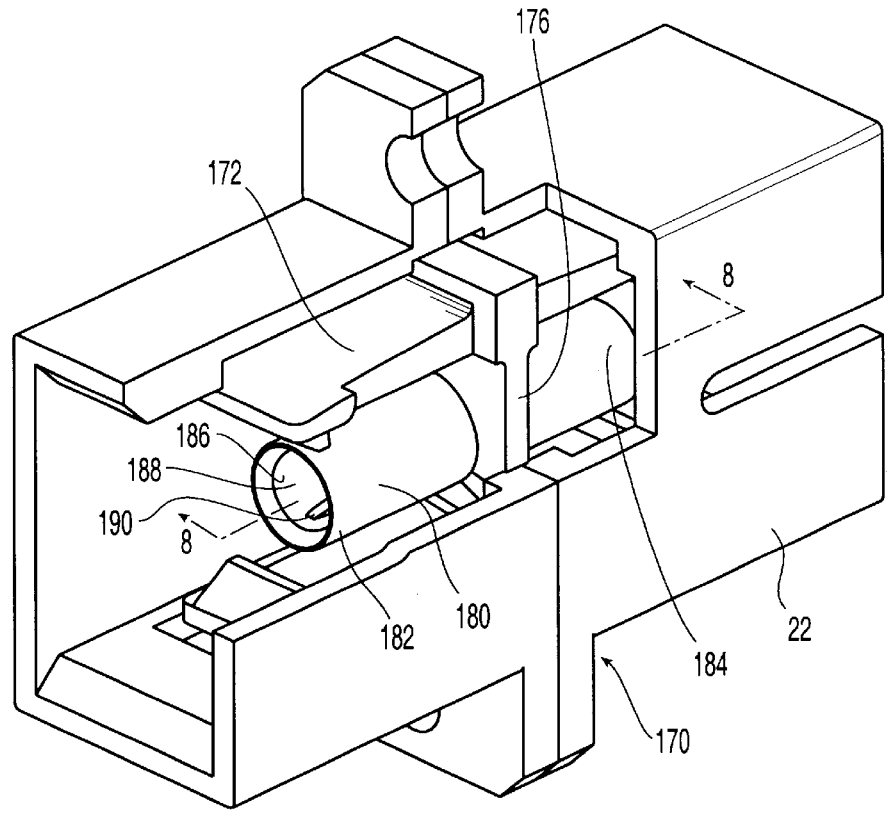
FIG. 7 is a cut away perspective view of an alternative embodiment of the present invention.
Figure 8:
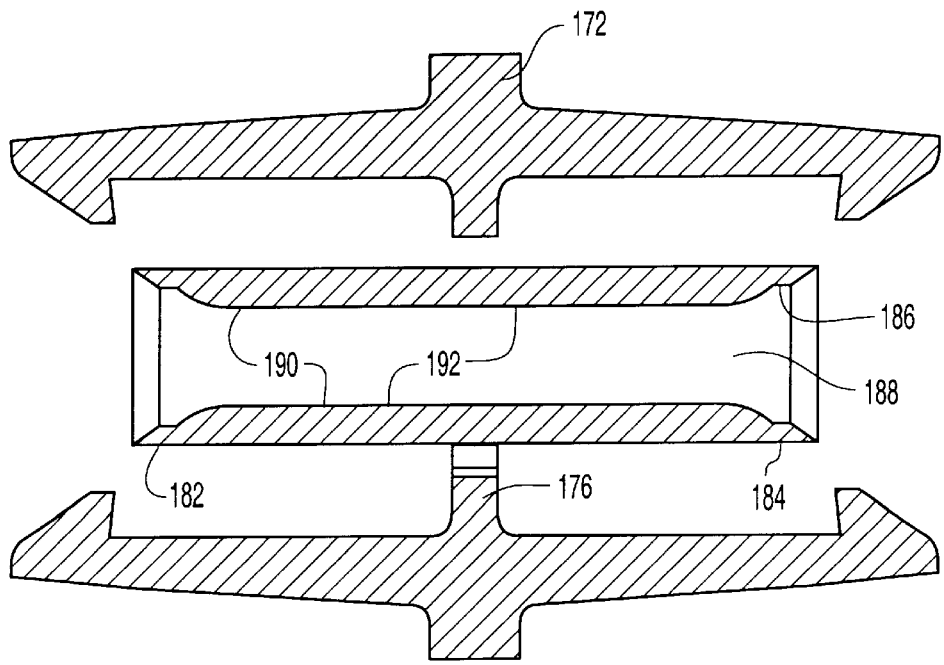
FIG. 8 is a longitudinal cross-section along line 8—8 of the inner block of FIG. 7.

With reference to FIGS. 7–8, an alternative embodiment of the present invention is shown. In the fiber optics industry, there are basically two families of optical fiber: multi-mode and single mode. The core of single mode fiber is much smaller than the core of multi-mode fiber and it takes more precision to align single mode fibers in a connector application. The previously discussed preferred embodiment is suitable for the heightened precision requirements of single mode fiber. However, with multi-mode fiber, the core of the fiber is larger and not as much precision is required. Accordingly, FIGS. 8–9 depict an alternative embodiment that is not as precise as the preferred embodiment but is precise enough for multi-mode fiber while being less expensive to manufacture than the preferred embodiment. Thus, where cost considerations outweigh the need for high precision, this alternative embodiment may be preferred.

Adapter assembly 170 in FIGS. 7–8 has outer housing 22 that can be the same as the outer housing in FIG. 1. Assembly 170 also has inner block 172 which is similar to inner block 24 of FIG. 1 with the exception that guide sleeve portion 180 and inner block 172 are molded as one piece with guide sleeve portion having the appearance of extending through mid portion 176 of inner block 172. As an alternative, guide sleeve portion 180 could be a separate piece that is snapped into mid portion 176 either laterally through an open cut-out or longitudinally through a hole or located in mid portion 176 by insert molding. Guide sleeve portion 180 has first end 182 and second end 184 opposite thereto. Sleeve portion has inside surface 186 that defines passageway 188. Formed on inside surface 186 is a pair of longitudinally extending ribs 190 diametrically opposed to each other and protruding radially inward. Ribs 190 are integrally formed with inner block 172. Ribs 190 have rib surface 192 with an arcuate cross-section that has a radius of curvature that matches the radius of curvature of the ferrule groove surface 162. The rib surface approximates exposed portion 104 of guide pins 28 in the preferred embodiment. While these ribs are not as precise as metal guide pins, they are sufficiently precise for multi-mode fiber. Upon insertion of ferrules 120, ribs 190 slide into ferrule grooves 140 and align the end faces of opposing ferrules rotationally and laterally relative to each other in the same manner as described with respect to the preferred embodiment.

With both the preferred embodiment and the alternative embodiment, a sleeve that is sized to receive two ferrules therein has two longitudinally extending geometries that slide into matching geometries on the ferrules as the ferrules are inserted into the sleeve. The need to precisely form or machine the inside diameter of the sleeve to match the outside diameter of the ferrule is eliminated as the two geometries are sufficient for both the lateral and the rotational alignment of the two end faces of the ferrules relative to each other.

Although the present invention has been described with respect to certain embodiments, various changes, substitutions and modifications may be suggested to one skilled in the art and it is intended that the present invention encompass such changes, substitutions and modifications as fall within the scope of the appended claims.

We claim:

1. An adapter assembly for removably receiving two optical fiber ferrules in an operative coupled relationship, each ferrule containing at least one optical fiber that terminates at an end face of the ferrule, each ferrule defining at least two ferrule grooves extending longitudinally rearward of the end face opposite each other, the adapter assembly comprising:

(a) a sleeve having a first open end and a second open end opposite thereto and having an interior surface defining a passageway longitudinally through the sleeve from the first open end to the second open end, the sleeve having an exterior surface, the first open end and the second open end each dimensioned for removably receiving one of the two ferrules therein for operative coupling with the other ferrule inserted opposite thereto in the passageway, the interior surface defining two sleeve grooves extending longitudinally opposite each other;

(b) two guide pins, each guide pin located longitudinally in one of the two sleeve grooves, each guide pin having a length and defining an outer surface along its length, each guide pin mounted in its respective sleeve groove such that an exposed portion of the outer surface of the guide pin along the entire length of the guide pin in the sleeve is exposed to the passageway, the exposed portions of the outer surfaces of the guide pins sized and located relative to each other to slide in the ferrule grooves and operatively align the end faces of the ferrules rotationally and laterally relative to each other when the two ferrules are inserted into the sleeve.

2. The adapter assembly of claim 1 wherein the grooves are coextensive with the passageway.

3. The adapter assembly of claim 2 wherein the cross-section of the grooves is generally the shape of a partial circle of between about 200 degrees and about 300 degrees such that the diameter of the partial circle is greater than the width of the groove at the interior surface and wherein the guide pins have a diameter generally that of the partial circle.

4. The adapter assembly of claim 3 wherein the sleeve is a molded plastic piece, the guide pins are metal, and the guide pins are insert molded in the grooves.

5. The adapter assembly of claim 4 wherein the outer surface of the guide pin that is against the groove is disrupted so that the groove's surface will conform to such disruptions during molding and prevent longitudinal movement of the guide pins.

6. The adapter assembly of claim 1 further comprising an inner block having a mid portion that is generally planar and perpendicular to the sleeve, the mid portion defining a cut-out sized to receive the sleeve extending therethrough, the inner block having two pairs of latch arms extending opposite each other parallel with the sleeve, the latch arms sized and located to engage a connector.

7. The adapter assembly of claim 6 wherein the cut-out is open and the sleeve is laterally inserted therein.

8. The adapter assembly of claim 7 wherein the outer surface of the sleeve defines a reduced cross-section portion at a midpoint along the sleeve and wherein the cross-section of the cut-out has a first portion that is sized to receive the reduced cross-section portion of the sleeve and a second portion through which the sleeve is snap inserted.

9. The adapter assembly of claim 6 further comprising an outer housing in which the inner block and sleeve are located, the outer housing sized to receive connectors therein.

10. The adapter assembly of claim 1 wherein the sleeve has a closed cross-section along its entire length.

11. An adapter assembly for removably receiving two optical fiber ferrules in an operative coupled relationship, each ferrule containing at least one optical fiber that terminates at an end face of the ferrule, each ferrule defining at least two ferrule grooves extending longitudinally rearward of the end face opposite each other, the adapter assembly comprising:

(a) a sleeve having a first open end and a second open end opposite thereto and having an interior surface defining a passageway longitudinally through the sleeve from the first open end to the second open end, the passageway sized to receive the two ferrules therein to the extent that a length of the ferrule grooves of each ferrule is disposed inside the passageway when the ferrules are inserted in the sleeve, the sleeve having an exterior;

(b) two guide pins fixedly and permanently mounted in the sleeve parallel to each other and parallel with the passageway and located opposite each other in the passageway, at least a portion of the outer surfaces of each guide pin exposed in the passageway, the portions shaped and located relative to each other to slide in the ferrule grooves of the ferrules and operatively align the end faces of the ferrules rotationally and laterally relative to each other when the two ferrules are inserted into the sleeve.

12. The adapter assembly of claim 11 wherein the guide pins are mounted to the interior surface of the sleeve.

13. The adapter assembly of claim 12 wherein the interior surface defines two grooves extending longitudinally and located generally opposite each other and wherein the guide pins are mounted in the grooves.

14. The adapter assembly of claim 11 wherein the guide pins have a generally cylindrical outer surface and about 180 degrees or less of the outer surface along generally the entire length of the guide pins is exposed in the passageway.

15. The adapter assembly of claim 14 wherein about 180 degrees or more of the outer surface along the generally entire length of the guide pins is located against the sleeve and is disrupted in a radial direction such that when the interior surface of the sleeve conforms to the disruption, the guide pins are positively retained in the longitudinal direction.

16. An adapter and connector assembly comprising:

(a) two optical fiber ferrules, each ferrule containing at least one optical fiber that terminates at an end face of the ferrule, each ferrule defining at least two open ferrule grooves extending longitudinally rearward of the end face opposite each other;

(b) a sleeve having a first open end and a second open end opposite thereto and having an interior surface defining a passageway longitudinally through the sleeve from the first open end to the second open end, the ends faces of the ferrules abutted against each other at a point in the passageway such that the two open ferrule grooves of the ferrules are aligned and a length of each ferrule groove disposed inside the passageway, the sleeve having an exterior surface;

(c) two guide pins fixedly and permanently mounted in the sleeve parallel to each other and parallel with the passageway and located opposite each other in the passageway, at least a portion of the outer surfaces of each guide pin exposed in the passageway, the portions shaped and located relative to each other to slide in the ferrule grooves of the ferrules and operatively align the end faces of the ferrules rotationally and laterally relative to each other.

17. The assembly of claim 16 wherein the ferrule has a body portion that tapers radially inward to the end face defining a tapered portion.

18. The assembly of claim 17 wherein the ferrule grooves have a first end beginning in the tapered portion and a second end opposite thereto.

19. The assembly of claim 16 further comprising an inner block that defines a cut-out to receive the sleeve therethrough and having at least two latch arms and further comprising a connector housing in which the ferrule is located and that has engagement features for engaging with the latch arms of the inner block.

20. The assembly of claim 16 wherein the interior surface of the sleeve defines two grooves extending longitudinally and opposite each other and wherein the guide pins are mounted in the grooves.

21. An adapter assembly for removably receiving two optical fiber ferrules in an operative coupled relationship, each ferrule containing at least one optical fiber that terminates at an end face of the ferrule, each ferrule defining at least two ferrule grooves extending longitudinally rearward of the end face opposite each other, the adapter assembly comprising:

(a) a sleeve having a first open end and a second open end opposite thereto and having an interior surface defining a passageway longitudinally through the sleeve from the first open end to the second open end, the passageway sized to receive the two ferrules therein to the extent that a length of the ferrule grooves of each ferrule is disposed inside the passageway when the ferrules are fully received in the sleeve, the sleeve having an exterior;

(b) two ribs defined along the interior surface and extending longitudinally parallel with the passageway and protruding radially inward into the passageway, the ribs shaped and located relative to each other to slide in the ferrule grooves of the ferrules and operatively align the end faces of the ferrules rotationally and laterally relative to each other when the two ferrules are inserted into the sleeve.

22. The adapter assembly of claim 21 wherein the ribs are continuous along their length.

23. The adapter assembly of claim 21 wherein the cross-section of the ribs is constant along the length of the ribs.

24. The adapter assembly of claim 21 wherein the sleeve and ribs are one molded piece.

* * * * *